(12) United States Patent
Plattsmier et al.

(10) Patent No.: US 10,267,440 B2
(45) Date of Patent: Apr. 23, 2019

(54) APPARATUS AND METHOD FOR STRENGTHENING WELDED-LAP JOINTS FOR STEEL PIPELINE

(71) Applicant: HDR, INC., Omaha, NE (US)

(72) Inventors: John R. Plattsmier, Omaha, NE (US); Matthew J. Duffy, Beaverton, OR (US)

(73) Assignee: HDR, INC., Omaha ( * ) Notice: Subject to any disclaimer, the term of this patent is extended or adjusted under 35 U.S.C. 154(b) by 221 days.

(21) Appl. No.: 15/248,764

(22) Filed: Aug. 26, 2016

(65) Prior Publication Data

US 2017/0234463 A1 Aug. 17, 2017

Related U.S. Application Data

(60) Provisional application No. 62/210,009, filed on Aug. 26, 2015, provisional application No. 62/378,519, filed on Aug. 23, 2016.

(51) Int. Cl.
*B23K 31/02* (2006.01)
*F16L 13/02* (2006.01)
*B23K 101/10* (2006.01)
*B23K 101/06* (2006.01)

(52) U.S. Cl.
CPC ........ *F16L 13/0209* (2013.01); *B23K 31/027* (2013.01); *B23K 2101/06* (2018.08); *B23K 2101/10* (2018.08)

(58) Field of Classification Search
CPC . F16L 13/0209; F16L 13/0245; F16L 13/254; B23K 31/027; B23K 2101/10; B23K 2101/04; B23K 2101/06
See application file for complete search history.

(56) References Cited

U.S. PATENT DOCUMENTS

| 1,816,770 | A | * | 7/1931 | Gradl | F16L 13/0209 |
| | | | | | 285/229 |
| 1,872,271 | A | * | 8/1932 | Furrer | F16L 13/0209 |
| | | | | | 219/137 R |
| 1,903,315 | A | * | 4/1933 | Priebe | F16L 13/0209 |
| | | | | | 219/61 |
| 1,966,248 | A | * | 7/1934 | Kane | E21B 17/08 |
| | | | | | 166/380 |
| 1,977,987 | A | * | 10/1934 | Corby | G01M 3/2853 |
| | | | | | 228/104 |
| 2,037,962 | A | * | 4/1936 | Brown | F16L 13/0209 |
| | | | | | 285/22 |

(Continued)

FOREIGN PATENT DOCUMENTS

DE 3731270 C1 1/1989
EP 0537377 A1 4/1993

(Continued)

*Primary Examiner* — Kiley S Stoner
(74) *Attorney, Agent, or Firm* — Erickson Kernell IP, LLC; Mark C. Young

(57) ABSTRACT

An apparatus and method for reinforcing a welded-lap pipe joint includes a first pipe segment having a bell-end presenting a receptacle, a spigot-end of a second pipe segment extending into and welded to the bell-end receptacle to form a welded-lap joint, and a bell-shaped reinforcing sleeve surrounding the welded-lap joint. In exemplary embodiments the reinforcing sleeve is welded to the first or second pipe segments. Also disclosed are a method of assembling a reinforced welded-lap pipe joint.

13 Claims, 12 Drawing Sheets

(56) References Cited

U.S. PATENT DOCUMENTS

| | | | | |
|---|---|---|---|---|
| 2,273,154 A | * | 2/1942 | Stromsoe | F16L 13/0263 220/680 |
| 2,289,271 A | * | 7/1942 | Kane | E21B 17/08 166/242.6 |
| 2,576,012 A | | 11/1951 | Gurck | |
| 2,816,211 A | * | 12/1957 | Hutchins | B21D 39/04 219/106 |
| 2,933,428 A | * | 4/1960 | Mueller | B29C 65/0672 156/294 |
| 3,061,503 A | | 10/1962 | Gould et al. | |
| 3,126,625 A | * | 3/1964 | Laing | B21D 39/04 228/112.1 |
| 3,266,820 A | * | 8/1966 | Leborgne | F16L 13/0263 228/50 |
| 3,352,578 A | * | 11/1967 | Burke | F16L 13/0227 228/234.3 |
| 3,397,445 A | * | 8/1968 | Ulmer | B21C 1/22 219/609 |
| 3,506,519 A | | 4/1970 | Blumenkranz | |
| 3,528,688 A | * | 9/1970 | Stenerson | B23K 1/18 228/216 |
| 3,555,667 A | * | 1/1971 | Carlson et al. | F16L 25/01 228/164 |
| 3,633,266 A | * | 1/1972 | Taylor | B23K 1/002 219/611 |
| 3,759,553 A | | 9/1973 | Carter | |
| 3,762,624 A | * | 10/1973 | Sprung | B21C 37/08 228/103 |
| 3,965,555 A | * | 6/1976 | Webster | B23K 9/0026 29/890.14 |
| 3,966,520 A | * | 6/1976 | Fallenbeck | B29C 65/088 156/73.1 |
| 3,985,279 A | * | 10/1976 | Wilson | B23K 20/085 228/109 |
| 3,994,429 A | * | 11/1976 | Hallenbeck | B23K 9/325 228/57 |
| 4,062,570 A | * | 12/1977 | Wilson | B23K 20/085 228/50 |
| 4,077,559 A | * | 3/1978 | Watson, Jr. | B23K 1/0012 228/154 |
| 4,176,274 A | * | 11/1979 | Lippera | B29C 65/342 219/522 |
| 4,196,923 A | * | 4/1980 | Zimmerli | C09J 5/02 228/119 |
| 4,248,373 A | * | 2/1981 | Linse | B23K 20/085 228/107 |
| 4,266,997 A | | 5/1981 | Lippera | |
| 4,513,188 A | * | 4/1985 | Katzenstein | B23K 20/06 219/617 |
| 4,579,273 A | * | 4/1986 | Dahmen | F16L 13/02 228/102 |
| 4,594,873 A | * | 6/1986 | Kaunitz | B21D 41/02 72/340 |
| 4,645,243 A | | 2/1987 | Bucher et al. | |
| 4,807,910 A | | 2/1989 | Johansson et al. | |
| 4,910,379 A | * | 3/1990 | Preston | B23K 9/20 219/136 |
| 5,001,320 A | * | 3/1991 | Conley | B23K 9/0358 219/60 R |
| 5,080,404 A | | 1/1992 | Sauer | |
| 5,265,790 A | * | 11/1993 | Mumford, III | F16L 13/0263 228/189 |
| 5,338,072 A | * | 8/1994 | Bitter | F16L 13/08 228/198 |
| 5,736,715 A | | 4/1998 | Keyes | |
| 6,131,956 A | | 10/2000 | Foering et al. | |
| 6,241,290 B1 | | 6/2001 | Foering et al. | |
| 6,550,500 B2 | | 4/2003 | Jarvenkylaet et al. | |
| 6,654,995 B1 | * | 12/2003 | Wang | B21D 39/04 219/93 |
| 6,698,644 B2 | * | 3/2004 | Lorenz | B23K 1/0008 228/131 |
| 7,204,520 B2 | | 4/2007 | Mueller et al. | |
| 7,516,990 B2 | | 4/2009 | Jamison et al. | |
| 2006/0243649 A1 | * | 11/2006 | Deremiah | C02F 1/78 210/192 |
| 2007/0040381 A1 | * | 2/2007 | Mieszelewicz | F16L 13/0209 285/374 |
| 2007/0272340 A1 | * | 11/2007 | Castaneda | B29C 65/20 156/64 |
| 2010/0102038 A1 | * | 4/2010 | Baum | B23K 37/0276 219/117.1 |
| 2013/0299561 A1 | * | 11/2013 | Higgins | B23K 20/129 228/114 |

FOREIGN PATENT DOCUMENTS

| | | | | |
|---|---|---|---|---|
| GB | | 318541 A | * 10/1930 | F16L 13/0209 |
| WO | 2001063163 A1 | | 8/2001 | |

* cited by examiner

APPARATUS AND METHOD FOR STRENGTHENING WELDED-LAP JOINTS FOR STEEL PIPELINE

CROSS-REFERENCE TO RELATED APPLICATIONS

This application claims priority to U.S. Provisional Application Ser. No. 62/210,009 filed on Aug. 26, 2015, and to U.S. Provisional Application Ser. No. 62/378,519 filed on Aug. 23, 2016, each of which is hereby incorporated by reference herein in their entireties.

BACKGROUND OF THE INVENTION

Pipelines are used to transport fluid materials such as liquids or gasses across long distances, over and under land and water. In the U.S. alone, several million miles of pipelines are used to carry water, oil, natural gas, and other resources from one point to another. Pipelines are typically built as large hollow cylindrical conduits constructed by successively joining individual pipe segments to form a tubular pipeline of virtually any desired length. The material, diameter, and other physical characteristics of a pipeline vary depending on the material to be transported, the required volumetric flow rate to transport, and the structural and environmental conditions to which the pipeline is expected to be subjected. For example, steel pipelines having a diameter of over sixty inches are often used to transport large volumetric flow rates of water and other liquids. Steel pipelines having diameters ranging from under six inches to over twelve feet are common, with larger and smaller diameters sometimes used for specific applications.

Because pipelines are routed underground or above ground as necessary, and span vast lengths, they are often subjected to ground induced actions that apply forces to the pipelines that may threaten their structural integrity. For example, seismic events, in the form of seismic wave actions; or permanent ground deformations, such as a fault movement, liquefaction-induced settlement/uplifting and lateral spreading, or landslide motion, all induce movement and inflict forces upon portions of the pipeline. Data collected from pipelines subjected to earthquakes show that permanent ground deformations are the primary source of threat for buried pipeline integrity, usually resulting in bending and deformation of portions of the pipeline.

Various standards and criteria applicable to the construction of pipelines are known and used within the pipeline industry to define allowable limits and quantify pipeline performance. For example, with respect to water-carrying pipelines, the primary performance criteria is ""no loss of containment"" upon occurrence of a seismic or other movement event. In view of those criteria, pipe segments are not normally linked by gasket joint systems where significant seismic action is expected, instead the pipe joints are welded to provide a more secure attachment between segments.

Welded pipeline joints may take various forms, including butt-welded, where two plane ends of adjoining pipe segments are aligned and welded, and lap-welded, where an expanded end (bell) of one pipe segment is placed over a stub end (spigot) of an adjoining pipe segment and welded. Lap welded joints are either single welded (a weld on one end of the spigot or bell) or double welded (a weld on both the bell and spigot-end of the lap joint).

Welded-lap joints have been extensively used in steel water pipelines rather than butt-welded joints because of they typically have lower installation costs. However, even though more favored for field assembly than butt-welded joints, industry data shows that welded-lap joints may constitute a weak point in the pipeline. Because of their geometry and the resulting stress path the bell eccentricity creates, under severe compressive loading conditions welded-lap joints are prone to fail—typically in the form of wrinkles occurring as localized deformation and folding at the bell eccentricity. This deformation may lead to fracture of the pipeline due to excessive local tensile strain or fatigue under operational loading conditions.

Thus, there remains a need in the art for an improved apparatus and method for joining pipe segments in a pipeline to provide superior strength, resilience, and resistance to failure under movement conditions.

SUMMARY OF THE INVENTION

An apparatus and method for reinforcing a welded-lap joint for steel pipe includes a first pipe segment having a bell-end presenting a receptacle for receiving a mating spigot-end (i.e., a stub-end), a spigot-end of a second pipe segment extending into and welded to the bell-end receptacle to form a welded-lap joint, and a bell-shaped reinforcing sleeve surrounding the welded-lap joint. In various exemplary embodiments the first and/or second ends of the reinforcing sleeve is welded to the first or second pipe segments.

In another aspect the present invention is directed to a method of reinforcing a welded-lap pipe joint by positioning a cylindrical reinforcing sleeve around a cylindrical pipe segment and expanding the pipe end and sleeve simultaneously to form a bell-end on the pipe segment and a bell-shaped reinforcing sleeve surrounding the pipe end.

Various objects and advantages of this invention will become apparent from the following description taken in relation to the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF EXEMPLARY EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. It should further be understood that the features of the invention as depicted and described in the various exemplary embodiments may be arranged in combinations other than those specifically depicted.

Pipelines for carrying liquid, gas, or other flowable materials across of land and water are known in the art. A typical steel pipeline comprises a plurality of hollow cylindrical pipe segments attached end-to-end, extending over long distances underground, above ground, or under water. Various methods and means for attaching the pipe segments into a pipeline are known in the art.

Figure 1:
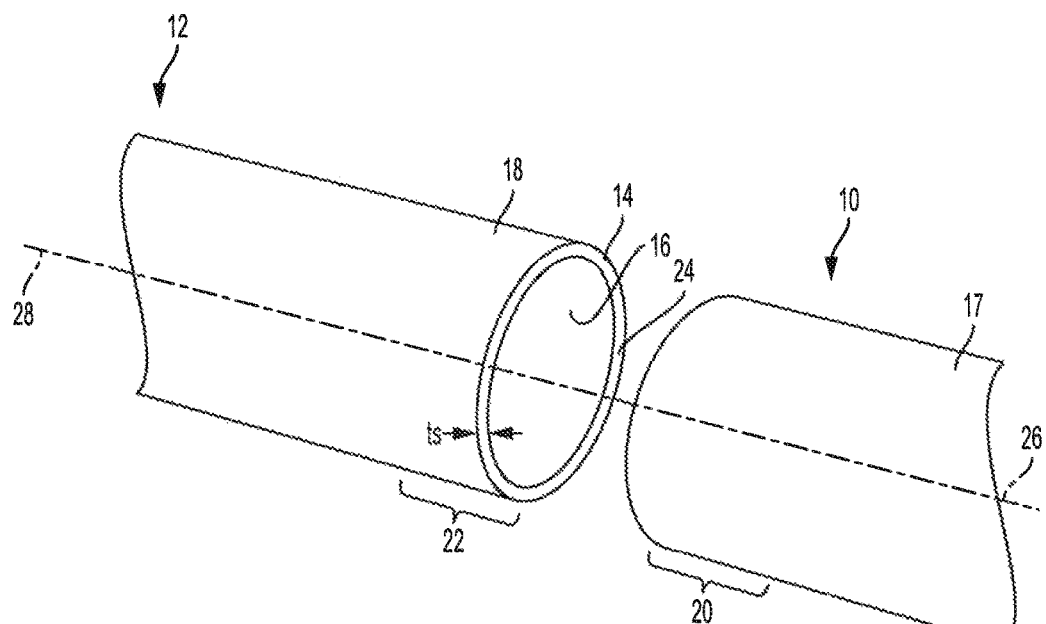
FIG. 1 is an exploded perspective view of a spigot-end to spigot-end pipe joint as known in the prior art.
Figure 2:
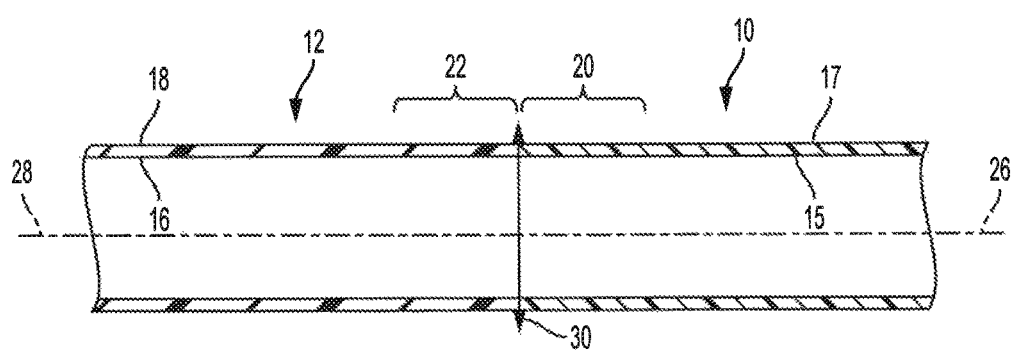
FIG. 2 is a cross-sectional side view of a spigot-end to spigot-end pipe joint having a full butt-weld as known in the prior art.

For example, FIGS. 1 and 2 depict one known method of attaching first 10 and second 12 pipe segments to form a pipeline. Each of the straight pipe segments 10, 12 comprises a hollow cylindrical tube formed by a continuous wall 14 having a substantially constant thickness t around the circumference of the pipe segment. The continuous wall 14 defines the pipe segment's inner 16 and outer 18 surfaces. The adjacent cylindrical end portion 20, 22, of each pipe segment is a spigot-end (i.e., a straight or stub-end, not flared or belled), having the same inner and outer diameters and wall thickness as the main body portion of the pipe segment. The face 24 of each pipe segment is a flat ring, lying in a plane extending generally perpendicular to the corresponding pipe segment's longitudinal axis 26, 28.

Looking to FIG. 2, when joined into a pipeline the two pipe segments 10, 12 are aligned along their longitudinal axes 26, 28 and placed together end-to-end so that the face of the first spigot-end 20 butts against the face of the second spigot-end 22. Thus positioned, the inner 15 and outer 17 surfaces of the first pipe segment 10 align with the corresponding inner 16 and outer 18 surfaces of the second pipe segment 12 such that the two aligned pipe segments form a single pipeline. The outer surfaces 17, 18 of the adjacent pipe segments 10, 12 are welded together around the entire circumference of the butt-joint to secure the two segments together, with the weld 30 protruding slightly outwardly from the adjoined outer surfaces. Note that the weld 30 depicted in the figures is illustrative, and does not necessarily reflect an actual or typical shape or protrusion of a welded butt joint. In practice, the end surfaces of the adjoining pipe segments may be beveled so that the weld between the beveled ends results in only a slight hump or protrusion at the joint. The end-to-end alignment and welding of subsequent adjoining pipe segments is repeated to build pipelines of a desired length.

Properly aligned pipe segments joined using a spigot-end to spigot-end welded butt-joint as just described are effectively as strong as a continuous pipe segment of the same length having no joints. However, the process of completing such butt-joints in the field is extremely exacting and labor intensive. In order to achieve a strong joint, the faces of the adjoining pipe segments must each be formed or cut so that the face is substantially perpendicular to the longitudinal axis of the pipe segment. Even when the faces are precisely formed, the longitudinal axes of the two adjoining pipe segments must be aligned precisely to achieve a uniform fit between the two faces. That configuration must be maintained while the entire circumference of the joint is welded to join the outer surfaces. In some cases, the inner surfaces of the adjoining pipe segments may likewise be joined by welding in a manner similar to described for the outer surfaces. Any variation in the perpendicularity of the faces, relative out-of-roundness of adjoined pipe segments, or any variation in the alignment of the adjoining pipe segments can result in a non-uniform gap at the joint which potentially results in a weak point in the joint.

Furthermore, any desired or intentional misalignment of the adjoining pipe segments will result in a non-uniform gap at the joint and a potential weakness. For example, if the distal end of the second pipe segment is required to be positioned slightly askew from its axially-aligned position, such as to connect to an offset existing line or fitting, that intentional misalignment necessarily affects the alignment of the faces of the adjoining pipe segments and potentially compromises the integrity of the welded butt-joint. Furthermore, the use of a miter at the distal end to achieve the desired alignment offset makes it more difficult to fit-up and align the second pipe segment spigot-end to minimize and achieve the optimal weld gap for a butt-weld joint.

Figure 3:
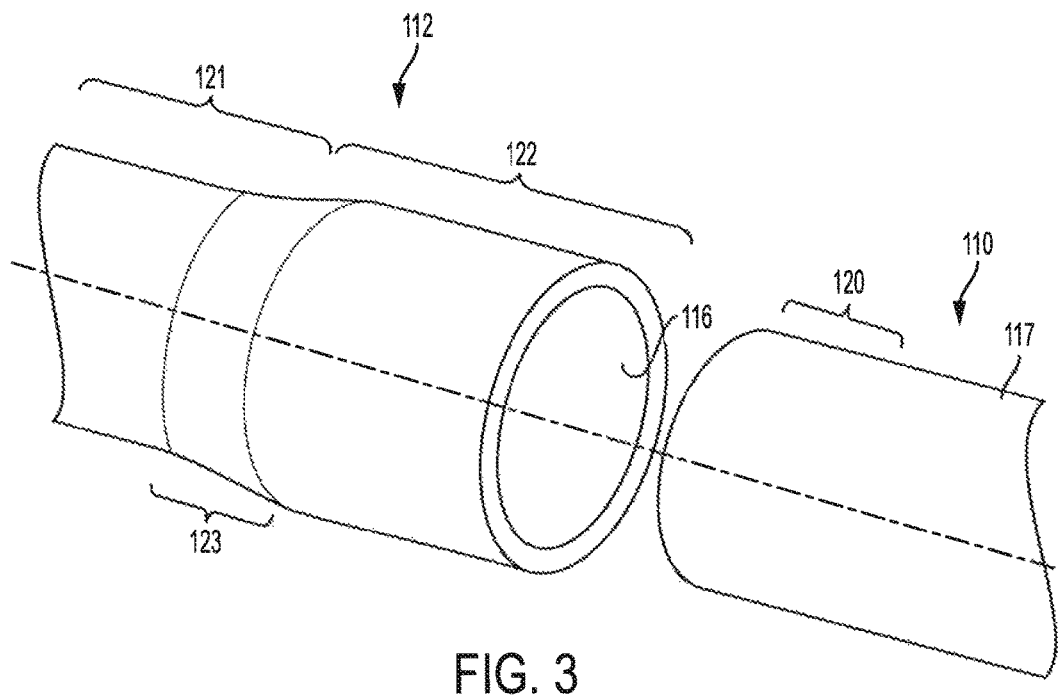
FIG. 3 is an exploded perspective view of a spigot-end to bell-end pipe joint as known in the prior art.
Figure 4:
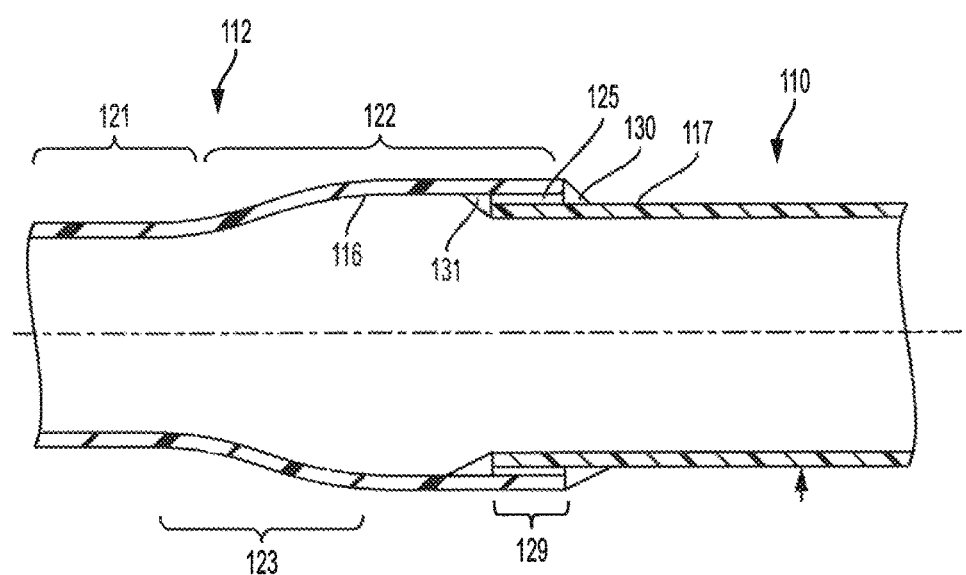
FIG. 4 is a cross-sectional side view of a spigot-end to bell-end pipe joint having a lap-weld as known in the prior art.
Figure 5:
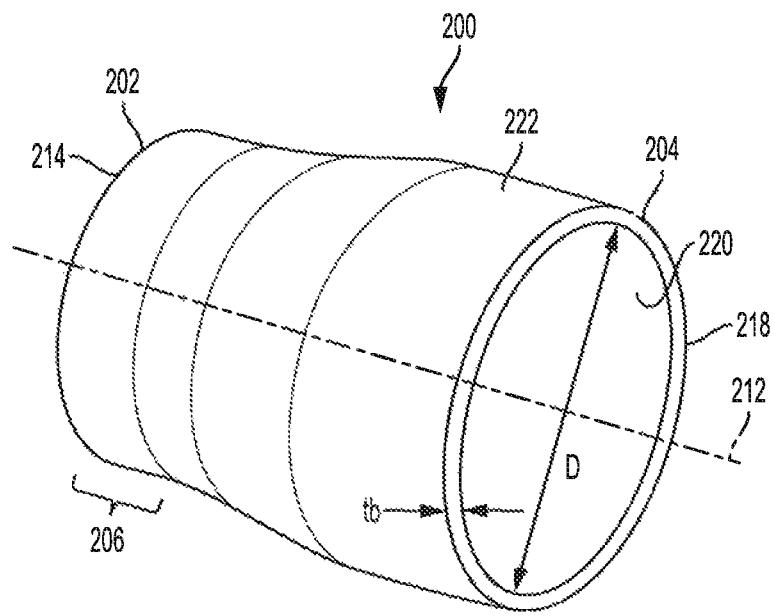
FIG. 5 is a perspective view of a reinforcing sleeve for a welded-lap spigot-end to bell-end pipe joint in accordance with an exemplary embodiment of the present invention.

In order to overcome the difficulties and shortcomings of butt-welded joints, pipelines comprised of pipe segments joined using welded lap-joints such as those depicted in FIGS. 3 and 4 are commonly used in the industry. Looking to those figures, adjoining pipe segments interconnect by mating a spigot-end 120 of a first pipe segment 110 into a bell-end 122 of a second pipe segment 112 such that the ends of the adjoined pipes overlap, with the spigot-end inside of the bell-end.

The spigot-end 120 of the pipe segment 110 is essentially identical to the spigot-end of the straight pipe segments 10, 12 described above with respect to the prior art of FIGS. 1 and 2, comprising a continuous wall having a thickness $t_s$ and defining an inner and outer surface of the pipe segment 110.

Second pipe segment 112 comprises a smaller diameter main body portion 121 that transitions into the larger diameter bell-end portion 122 at the end of the segment. Main body portion 121 is a straight pipe segment essentially identical to the straight pipe segments 10, 12 described above with respect to the prior art of FIGS. 1 and 2. The bell-end portion 122 is formed at the end of the segment by expanding the end of the pipe segment.

As can be seen in FIGS. 3 and 4, the transition between the main body portion 121 and the bell-end portion 122 comprises a shallow "S"-shaped transition area 123 where the wall of the pipe segment flares outwardly away from the longitudinal axis and then back toward that axis, into the larger diameter segment that extends to the end of the pipe segment 112.

As seen in FIG. 4, the inner diameter of the bell-end 122 is slightly larger than the outer diameter of the spigot-end 120 so that the spigot-end fits into the bell-end 122 receptacle leaving a small gap 125 between the outer surface 117 of the spigot-end 120 of the first pipe segment 110 and the inner surface 116 of the bell-end 122 of the second pipe segment. The width of the gap 125 may vary depending upon the application and/or the material being transported in the pipeline. For example, for welded steel pipeline carrying water, the American Water Works Association (AWWA) Standard C200 calls for the inside circumference of the bell end to not exceed the outside circumference of the spigot end by more than 0.400 inches. Preferably, the width of gap 125 is less than 0.400, most preferably the width is approximately 0.200 inches.

Looking still to FIG. 4, the lap joint is assembled by placing the spigot-end 120 of the first pipe segment 110 into the bell-end 122 of the second pipe segment 112 such that there is an overlap 129 of the two pipe segments. The overlap 129 between the two pipe segments may vary depending upon the application and/or the material being transported in the pipeline. For example, for welded steel pipeline carrying water, AWWA Standard C206 calls for an overlap of one inch, or three times the thickness of the belled pipe, whichever is greater. Thus, preferably, the overlap 129 is the greater of one inch or three times the thickness of the belled pipe. Most preferably, the overlap 129 is between approximately three inches and five inches to accommodate temperature fluctuations.

The end face of the bell-end 122 is typically welded 130 to the outer surface 117 of the spigot-end 120 around the outer circumference of the first pipe segment 110 to secure the two segments together. In many cases the end face of the spigot-end 120 is welded 131 to the interior surface 116 of the bell-end 122 around the interior joint between the two joined pipe segments. Thus, depending on which end faces are welded, a welded-lap joint is commonly referred to as a single-weld or double-weld joint. The apparatus and system of the present invention is not restricted to use with either single-weld or double-weld lap joints, although double-weld lap joints are predominate in the industry.

The welded-lap joint just described is more widely used in pipeline construction than the butt-joint previously described as a welded-lap joint is generally easier to assemble in the field and is more tolerant of variations in the axial alignment of adjacent pipe segments.

Figure 6:
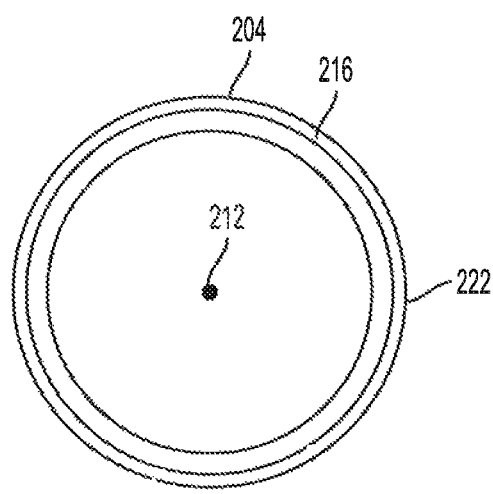
FIG. 6 is an end view of the reinforcing sleeve of FIG. 6
Figure 7:
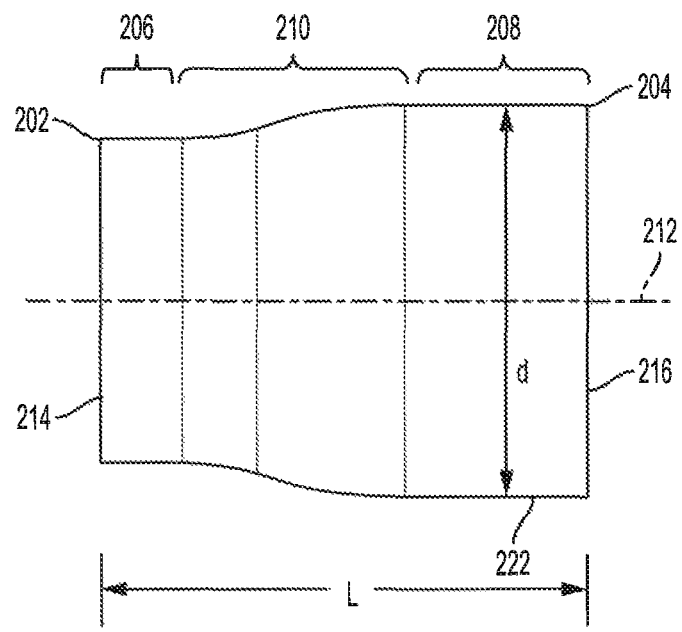
FIG. 7 is a side view of the reinforcing sleeve of FIG. 6.
Figure 8:
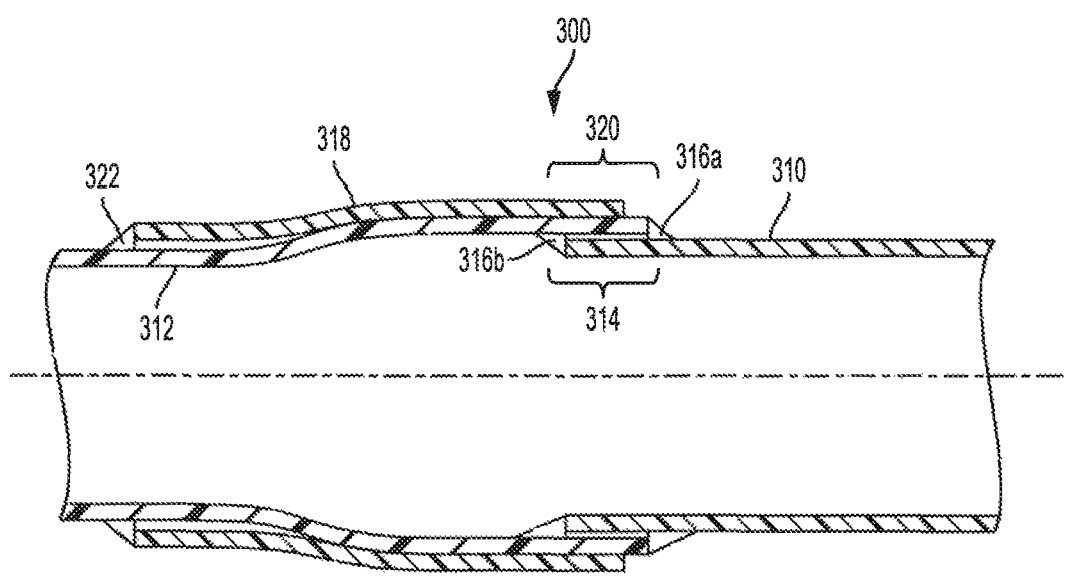
FIG. 8 is a cross-sectional side view of a reinforced spigot-end to bell-end welded-lap pipe joint with a reinforcing sleeve in accordance with an exemplary embodiment of the present invention.

The present invention is directed to a reinforcing sleeve apparatus and methods for reinforcing a welded-lap pipe joint as will now be described with respect to various exemplary embodiments. Looking to FIGS. 6 through 8, a sleeve for reinforcing a welded-lap pipe joint in accordance with an exemplary embodiment of the present invention is depicted generally by the numeral 200. The sleeve 200 comprises a bell-shaped elongated body extending between a smaller diameter first end 202 and a larger diameter second end 204.

The shape of the reinforcing sleeve is generally frusto-conical, tapering from a smaller diameter first end to a larger diameter second end, with the bell shape defined by the transition from a smaller diameter first segment 206 (extending inwardly from the first end 202), through an "S"-shaped (in profile) transition segment 210, to a larger diameter second segment 208 extending to the second end 204. As best seen in the side view of FIG. 8, the transition segment flares outwardly away from the longitudinal axis 212 of the sleeve at the end of the first segment 206 and back towards the longitudinal axis 212 at the beginning of the second segment 208 such that the diameter of the sleeve increases from the first end 202 to the second end 204.

The first 214 and second 216 faces of the sleeve each lie in a plane substantially perpendicular to the longitudinal axis 212 of the sleeve so that the two faces 214, 216 lie substantially parallel to each other. The sleeve has an overall length L, and an outer diameter d.

The length L of the sleeve can vary depending on the application, in one embodiment, the sleeve preferably extends from within one wall thickness of the end of the bell, through the "S" shape of the bell, and onto the straight pipe for at least approximately twelve inches. The outer diameter d of the sleeve is preferably sized such that it is larger than the parent pipe prior to expanding.

In other embodiments, the ratio of the length of the "S"-shaped transition portion 210 to the outer diameter d is approximately 0.03. In further embodiments, the length of the transition portion 210 is approximately two inches.

The sleeve 200 thus comprises a continuous outer wall 218 defining an interior surface 220 and an exterior surface 222, formed as a bell-shape having the properties just described.

Preferably, sleeve 200 is configured and shaped such that the interior surface 220 conforms closely to the shape of the outer surface of a bell-end portion of a welded-lap joint comprising a spigot-end to bell-end pipe joint as previously described.

Most preferably, sleeve 200 is made of steel having the same properties of the pipe which it is being used to reinforce.

Figure 9:
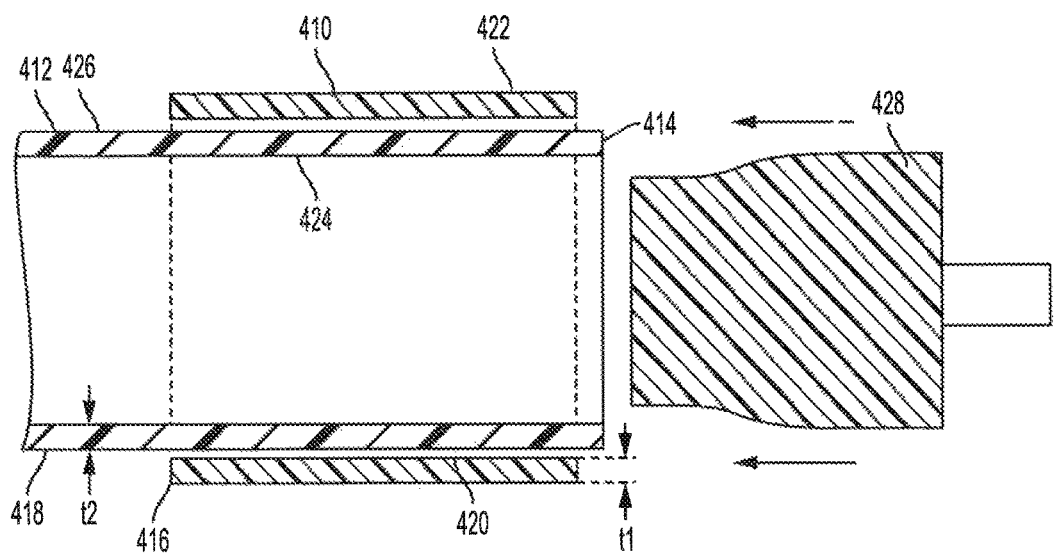
FIG. 9 is a cross-sectional side view of a method for making a bell-end pipe and reinforcing sleeve in accordance with an exemplary embodiment of the present invention."

Turning to FIG. 9, an exemplary embodiment of an apparatus and method for reinforcing a welded-lap pipe joint in accordance with the present invention using a reinforcing sleeve as just described is depicted generally by the numeral 300. A welded-lap pipe joint configured in a manner similar to that as previously described with respect to the prior art of FIGS. 3 and 4 comprises a first pipe segment 310 having a spigot-end and a second pipe segment 312 having a bell-end receptacle. The spigot-end is inserted into the bell end so that there is an overlap 314 between the two pipe segments, and the two segments are welded with either a single or double weld 316a, 316b as previously described.

A bell-shaped reinforcing sleeve 318, in accordance with the exemplary embodiment previously described with respect to FIGS. 3 and 4, is positioned over the bell-end of the second pipe segment. The shape and diameter along the length of the inner surface of the sleeve 318 preferably conforms closely to the shape and diameter along the corresponding length of the outer surface of the bell-end receptacle of the second pipe segment 312 so that the sleeve fits tightly over the second pipe segment.

Most preferably, the diameter of the outer surface of the bell-end of the of the second pipe segment 312 is approximately equal to the corresponding inner diameter of the sleeve 318 such that there is no gap, or minimal gap, between the two along the bell portion. In alternative embodiments, a gap may be formed between the inner surface of the sleeve and the outer surface of the bell-end of the second pipe segment along the inward portion of the sleeve, such as along the straight pipe portion of the second pipe segment.

As will be discussed in more detail below, in one exemplary embodiment the sleeve 318 is formed by expanding the bell-end of the second pipe segment and the sleeve simultaneously, thus the inner surface of the sleeve conforms closely to the outer surface of the bell-end.

The wall thickness of the reinforcing sleeve may be varied depending on the structural requirements of the pipeline. Preferably, the wall thickness of the reinforcing sleeve 318 is substantially the same as the wall thickness of the bell-end portion of the second pipe segment 312.

It should be understood that the reinforcing sleeve 318 achieves its increase in the strength of the welded-lap pipe joint by encompassing the joint, and that the reinforcing sleeve need not be attached or welded to the first or second pipe segments, it may remain in position through frictional engagement with the bell-end of the second pipe segment. In alternative embodiments, and as depicted in FIG. 9, the smaller diameter end of the reinforcing sleeve 318 is welded 322 to the outer surface of the second pipe segment 312 to prevent the sleeve from moving from its position overlapping the pipe joint.

In other alternative embodiments, the reinforcing sleeve 318 may be welded at its larger diameter end to the bell-end of the second pipe segment 312 to maintain the sleeve in its overlapping position. In yet other alternative embodiments, the reinforcing sleeve 318 may be welded at both ends to the second pipe segment 312 to prevent moisture or debris from entering the gap between the reinforcing sleeve 318 and the second pipe segment 312.

It should be further understood that in one embodiment of the present invention the reinforcing sleeve is manufactured separately from the pipes comprising the welded-lap joint and is positioned into place over the pipes prior to or subsequent to completing the welded-lap joint. In another embodiment of the present invention as will now be described with reference to FIGS. 9 and 10, the reinforcing sleeve is formed contemporaneously with the bell-end portion of the pipe segment.

Figure 10:
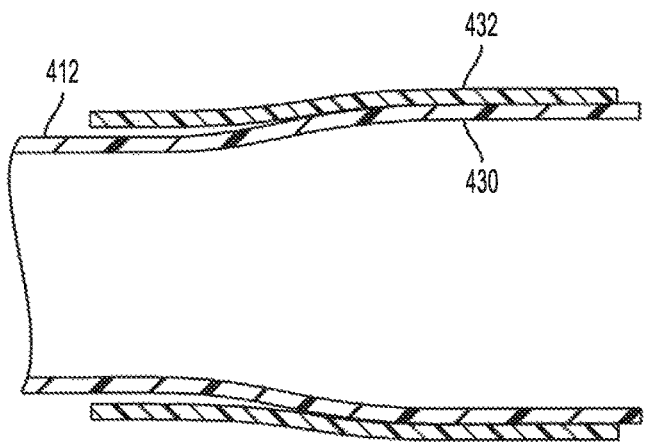
FIG. 10 is a cross-sectional side view of a bell-end pipe and reinforcing sleeve in accordance with an exemplary embodiment of the present invention.

Looking to FIGS. 9 and 10, a cylindrical sleeve 410 is positioned around a section of cylindrical straight pipe 412, adjacent an end 414 of the pipe segment. Similar to the cylindrical pipe segments described previously, the sleeve 410 and the pipe segment 412 each comprise a continuous wall 416 and 418, respectively, each wall having a corresponding thickness t1, t2. In the exemplary embodiment depicted the wall thickness t1 of the sleeve 410 and the wall thickness t2 of the pipe segment 412 are substantially identical. In alternative embodiments, the thickness of the walls may vary.

The continuous wall 416 of the sleeve defines the interior 420 and exterior 422 surfaces of the sleeve, and the continuous wall 418 of the pipe segment defines the interior 424 and exterior 426 surfaces of the pipe segment. Preferably, the interior diameter of the sleeve 410 conforms closely to the exterior diameter of the pipe segment. Most preferably, the gap between the inside surface of the reinforcing sleeve and the outside surface of the pipe end before expansion is in conformance with AWWA Standard C200, as discussed above to allow insertion of the spigot-end into the sleeve.

As depicted in the embodiment of FIG. 9, the cylindrical sleeve 410 is positioned adjacent an end 414 of the pipe segment 412, with the sleeve 410 entirely overlapping the segment such that no portion of the sleeve extends beyond the end 414 of the pipe segment. Most preferably, the outer end of the sleeve 410 is positioned inwardly from the outer end 414 of the pipe segment within a distance equal to the thickness t1 of the sleeve.

With the sleeve 410 thus positioned over the pipe segment 412 adjacent the end 414, the end portion of the pipe segment is expanded to form a bell-end receptacle and to simultaneously form the overlying cylindrical sleeve 410 into a bell-shape.

In one exemplary embodiment as depicted in FIG. 9 the pipe segment 410 end is swaged by pressing the end of the pipe segment over and onto a bell shaped die 428 (or by pressing the die 428 into the end of the pipe segment to expand the end of the pipe segment 412 and the overlying cylindrical sleeve 410 to conform to the shape of the outer surface of the die 428. The pipe and/or die are pressed together using a hydraulic press or other swaging tool known in the art. In addition, the pipe segment, the die, or both may be rotated to facilitate the expansion. Alternatively, the end of the pipe and overlying sleeve can be expanded to a bell-end receptacle using a hydraulic expansion tool.

Regardless of the method or tool used to expand the pipe end and sleeve, the result, as depicted in FIG. 10, is a bell-end receptacle 430 formed in the end of the pipe segment 410, and a bell-shaped reinforcing sleeve 432 formed from the expanded cylindrical sleeve.

Advantageously, because the reinforcing sleeve is formed simultaneously with and by the expansion of the end of the pipe segment, the interior surface of the reinforcing sleeve conforms closely to the exterior surface of the pipe segment. Most preferably, after expansion there is no gap between the outer surface of the bell-end receptacle 430 and the inner surface of the reinforcing sleeve 432.

As will be apparent to those skilled in the art, in alternative embodiments, the sleeve 410 may be longer than depicted and thus may extend over a longer portion of the pipe segment such that at least a portion of sleeve 410 is not expanded by the die. In those embodiments, a gap may exist between the inner surface of the sleeve and the outer surface of the pipe segment along the non-expanded portions. Preferably the dimension of the gap in those portions conforms to AWWA Standard C200 as discussed previously. It should be further understood that, depending on the length of the die 428 and the length of the non-expanded sleeve 410, and the depth to which the die is inserted into the pipe segment and the sleeve, that a gap may exist between the inner surface of the expanded reinforcing sleeve 432 and the outer surface of the pipe segment. These and other variations are within the scope of the present invention.

Similarly, because the bell-end of the pipe segment and the bell shape of the reinforcing sleeve are formed at the same time from the same die or expansion, any variations in the die or expansion tool are replicated on both the pipe end and the reinforcing sleeve, avoiding variances that may occur if the reinforcing sleeve is manufactured separately from the bell-end of the pipe.

With the bell-shaped reinforcing sleeve 432 formed and positioned around the bell-end receptacle 430 as just described, the welded-lap joint between the bell-end receptacle and a spigot-end pipe segment can be completed in a manner as previously described. When the joint is complete, the reinforcing sleeve 432 is positioned around the joint as previously described to reinforce and strengthen the joint. As also previously described, the reinforcing sleeve can be welded at one or both ends to secure the sleeve to the bell-end pipe segment.

The effectiveness of the reinforcing sleeve and the method of reinforcing welded-lap pipe joints of the present invention as just described is demonstrated by comparison of numerical and graphical results of two and three-dimensional modeling and finite element analysis performed on models of various configurations of plain straight pipes (i.e., pipe segments with no joints), unreinforced spigot-end to bell-end welded-lap pipeline joints, and reinforced spigot-end to bell-end welded-lap joints in accordance with the present invention.

Figure 11:
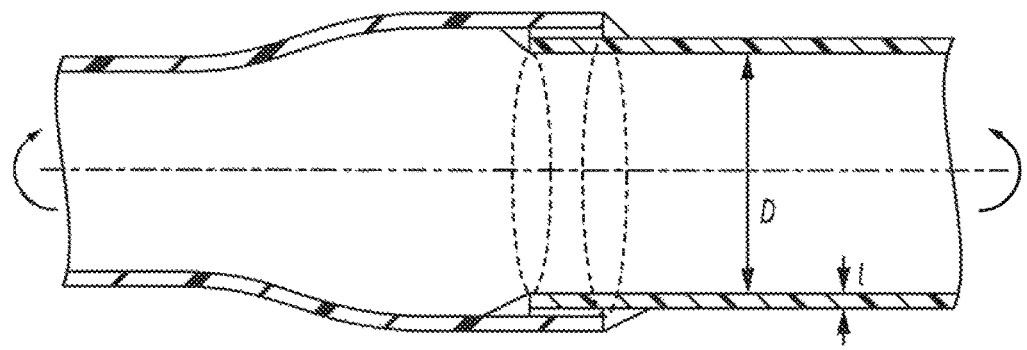
FIG. 11 is a schematic representation of a welded-lap joint under compressive loading.
Figure 13:
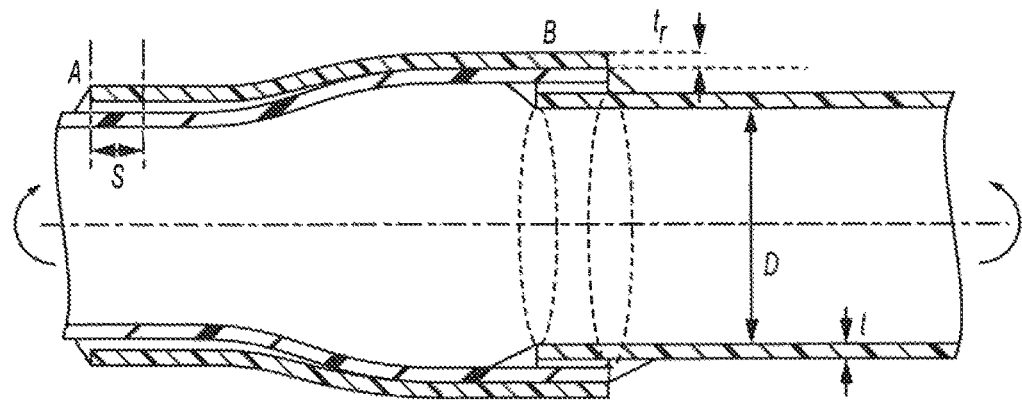
FIG. 13 is a schematic representation of a reinforced welded-lap joint in accordance with an exemplary embodiment of the present invention under compressive loading.

Looking to FIGS. 11 and 13, schematic representations of a welded-lap joint and a reinforced welded-lap joint in accordance with an exemplary embodiment of the present invention are depicted. A compressive load applied to the welded-lap joint is represented in each schematic by a differential rotation between the two jointed pipes. As depicted by the rotational arrows at each end of the schematic diagram, a rotation of either one of the joined pipes, or a differential in the rotation of both pipes will result in a compressive load applied to the respective welded-lap joint.

Figure 12:
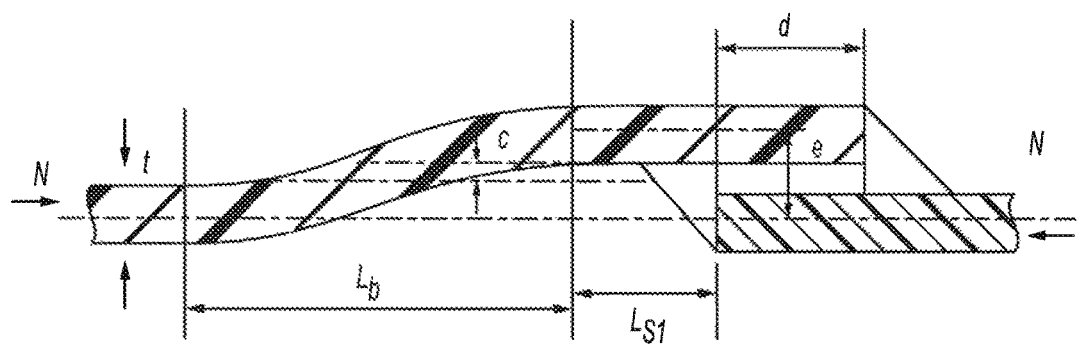
FIG. 12 is a representation of a mathematical model for analysis of the welded lap-joint of FIG. 11.
Figure 14:
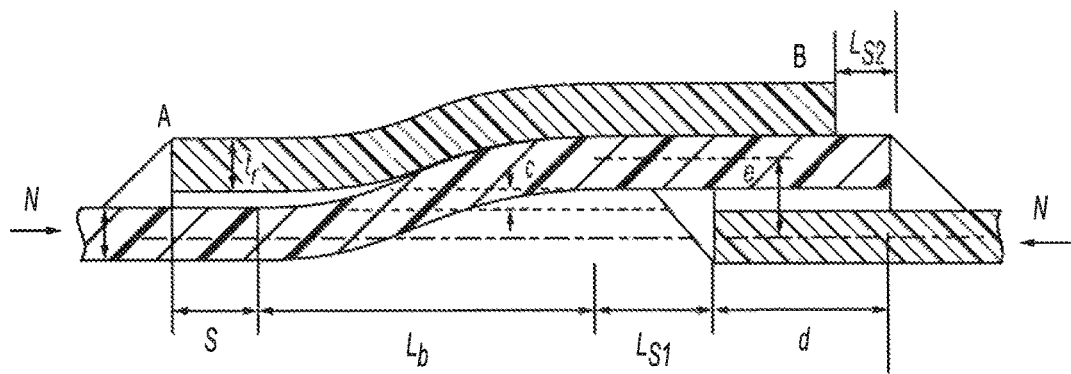
FIG. 14 is a representation of a mathematical model for analysis of the reinforced welded-lap joint of FIG. 13.

FIGS. 12 and 14 are representations of the mathematical models used to analyze the respective unreinforced and reinforced welded-lap pipe joints. The parameters identified in those models and the initial conditions used in the analysis are set forth in Table 1 as follows:

TABLE 1

| | | |
|---|---|---|
| D (in) | 67.75 | Pipe outer diameter |
| t (in) | 0.375 | Pipe thickness |
| $t_r$ (in) | 0.375 | Over-fit part thickness |
| s (in) | 2.0 | Length of straight part of over-fit part |
| d (in) | 3.0 | Distance between pipe welds |
| $L_{S1}$ (in) | 1.375 | Distance between internal pipe weld and curved part. |
| $L_{S2}$ (in) | 1.375 | Distance of over-fit bell from external pipe weld. |
| $L_b$ (in) | 5 | Pipe bell length |
| g (in) | 0.03-0 | Gap between over-fit part and pipe |
| c (in) | 0.05 | Gap between pipe bell and pipe spigot |
| e (in) | 0.50 | Joint eccentricity |

For purposes of the analysis, it is assumed that the first and second pipe segments and the reinforcing sleeve are made from grade 40 steel with yield stress equal to 43.9 ksi (303 MPa), that the welded-lap joint itself is double welded (i.e., welded on both the interior and exterior of the joint as described above), and that the nominal outer diameter of the spigot-end pipe segment is 67.75 inches with a wall thickness of 0.375 inches, corresponding to a diameter-to-thickness ratio of 180. As described in more detail below, analyses for a single-weld reinforcing sleeve and a double-weld reinforcing sleeve (as opposed to the double-weld lap joint) are performed.

FIGS. 15 through 22 depict and compare the results of plain pipes, unreinforced weld-lap joint pipes, and reinforced weld-lap pipe joints in accordance with the present invention subjected to varying bending moments applied and the resulting bending curvatures, over a range of operating yield pressures. The normalized bending moment/curvature graphs illustrate the point at which the pipe buckles, represented by the sudden drop or break in the data line corresponding to that analysis.

Figure 15:
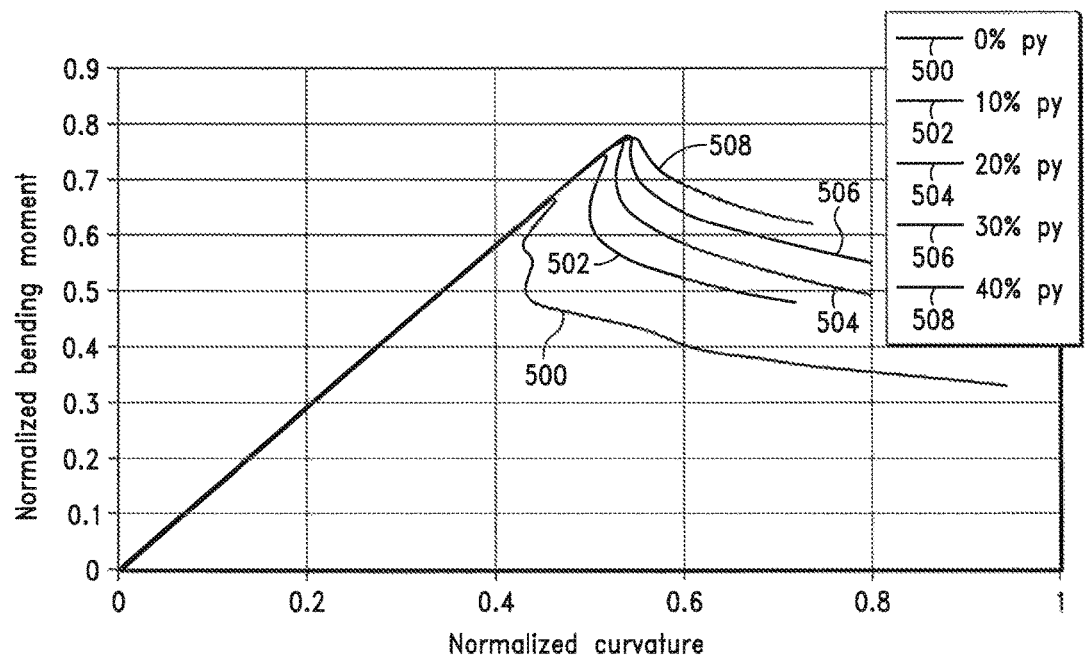
FIGS. 15 through 21 are graphical representations and comparisons of the results of three-dimensional finite element analysis of compressive force applied to plain pipe, an unreinforced welded-lap joint, and a reinforced welded-lap joint in accordance with an exemplary embodiment of the present invention over various operational pressures.

Looking first to FIG. 15, the results of applying an increasing bending moment to a plain pipe (i.e., a pipe with no joints whatsoever) are shown. Looking to FIG. 15, it can be seen that for a normalized bending moment of up to approximately 0.6, the normalized curvature of the straight pipe follows linearly over all ranges of internal yield pressure from 0 percent to 40 percent.

At a normalized bending moment of approximately 0.65 the 0 percent yield pressure pipe buckles as indicated by line 500, with the 10 percent, 20 percent, 30 percent, and 40 percent yield pressure cases following in succession as the normalized bending moment increases to approximately 0.75 as indicated by lines 502, 504, 506, and 508, respectively.

Figure 16:
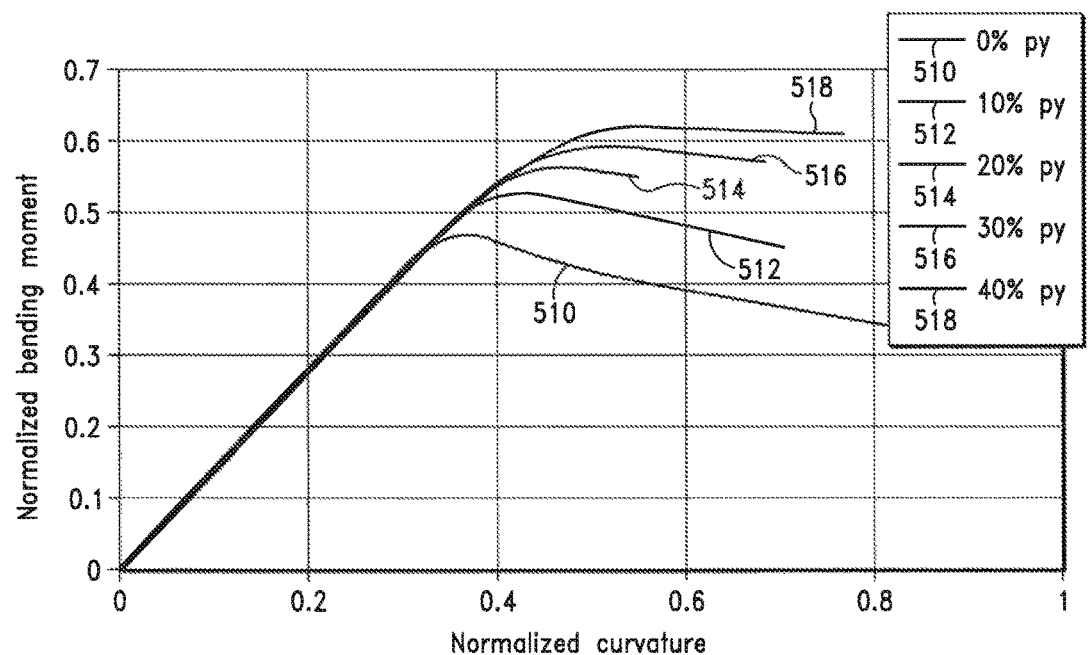

Turning to FIG. 16, the same analysis is performed for an unreinforced welded-lap joint. As seen in the graph, for a normalized bending moment of up to approximately 0.45, the normalized curvature of the unreinforced welded-lap joint follows linearly over all ranges of internal yield pressure from 0 percent to 40 percent.

At that normalized bending moment of approximately 0.45 the 0 percent yield pressure pipe buckles as indicated by line 510, with the 10 percent, 20 percent, 30 percent, and 40 percent yield pressure cases following in succession as the normalized bending moment increases to approximately 0.75 as indicated by lines 512, 514, 516, and 518, respectively.

Figure 17:
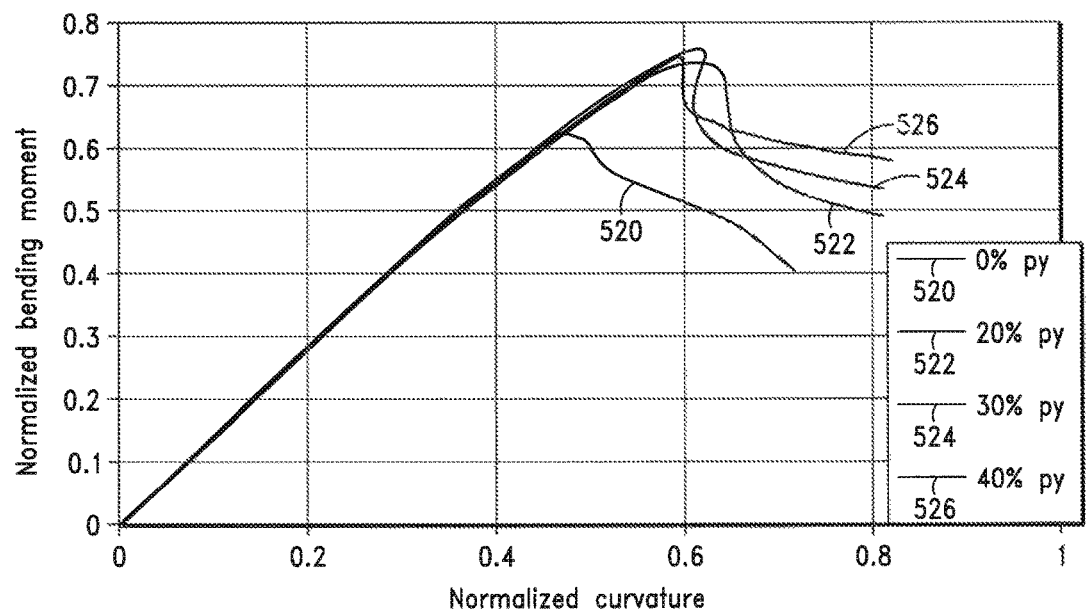

Looking to FIG. 17, the analysis is performed for a reinforced welded-lap joint (i.e., a reinforced joint having a reinforcing sleeve in accordance with the present invention) where the reinforcing sleeve is welded to the bell-end pipe segment only at one end of the sleeve. As seen in the graph, for a normalized bending moment of up to approximately 0.6, the normalized curvature of the unreinforced welded-lap joint follows linearly over all ranges of internal yield pressure from 0 percent to 40 percent.

At a normalized bending moment of approximately 0.63 the 0 percent yield pressure pipe buckles as indicated by line 520, with the 20 percent, 30 percent, and 40 percent yield pressure cases following in succession as the normalized bending moment increases to approximately 0.75 as indicated by lines 522, 524, and 526, respectively.

Figure 18:
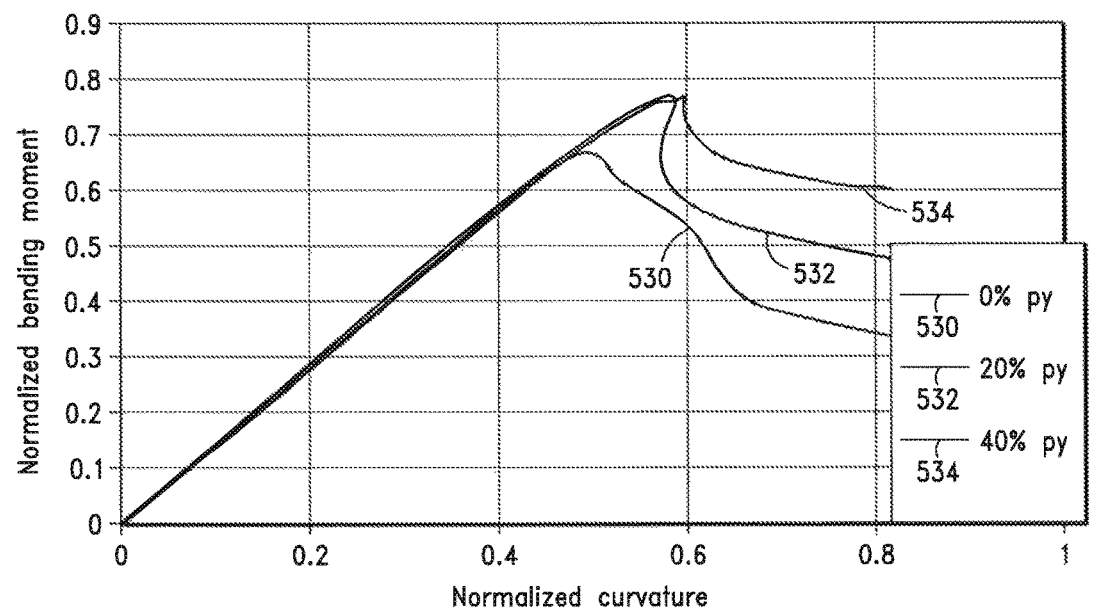

FIG. 18, depicts the results of the analysis performed for a reinforced welded-lap joint (i.e., a reinforced joint having a reinforcing sleeve in accordance with the present invention) where the reinforcing sleeve is welded to the bell-end pipe segment at both ends of the reinforcing sleeve. As seen in the graph, for a normalized bending moment of up to approximately 0.6, the normalized curvature of the unreinforced welded-lap joint follows linearly over all ranges of internal yield pressure from 0 percent to 40 percent.

Figure 19:
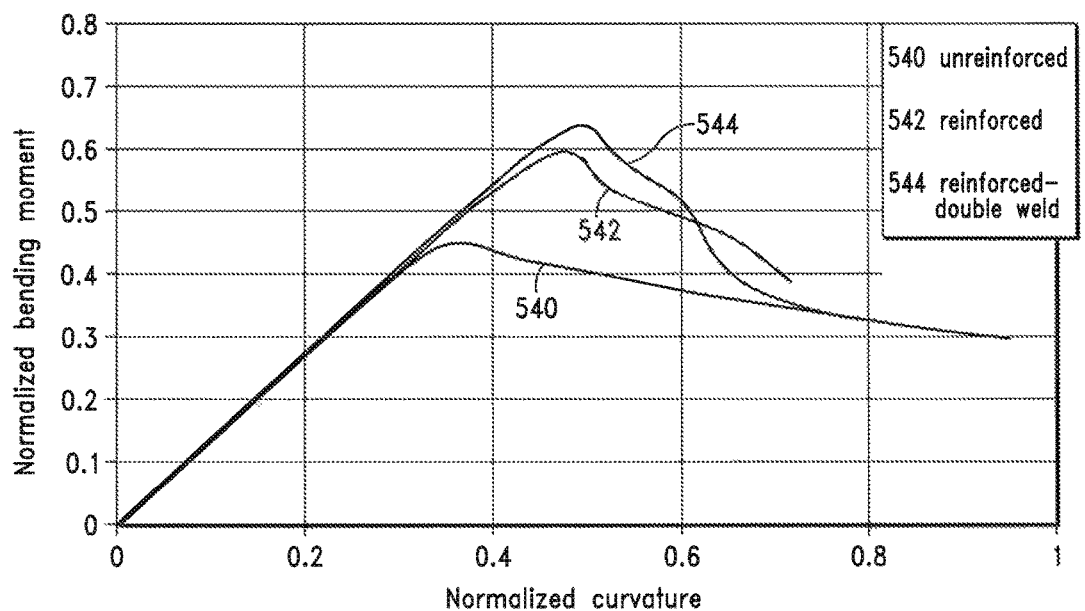
Figure 20:
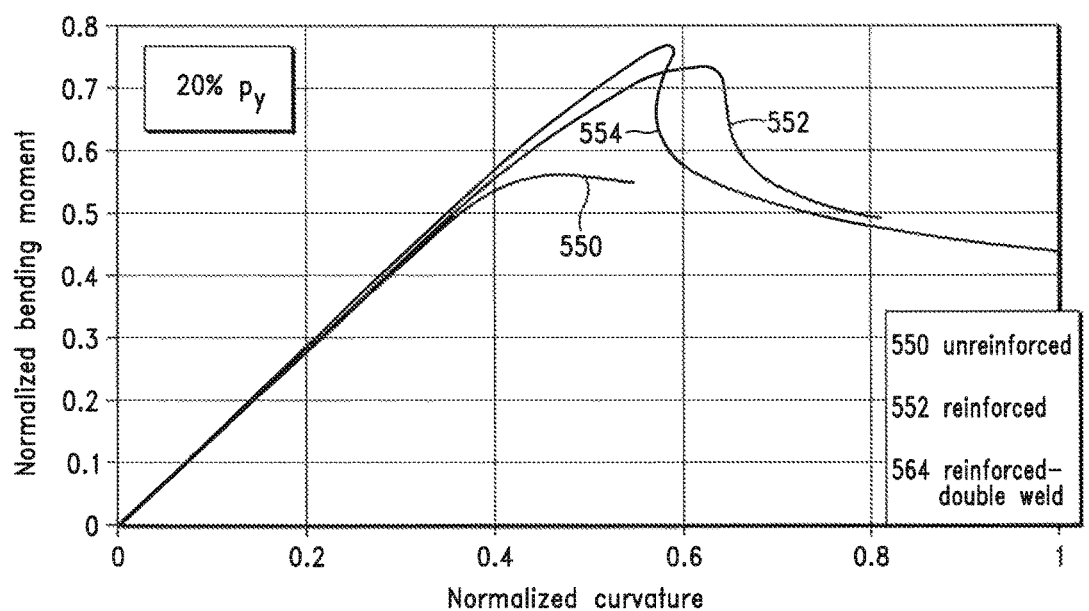
Figure 21:
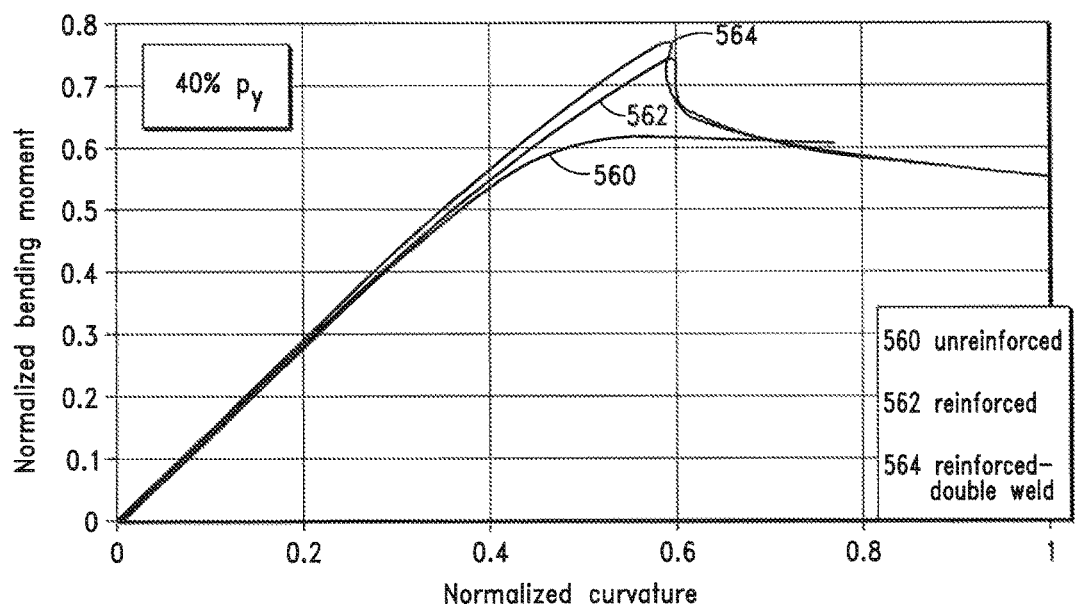

At a normalized bending moment of approximately 0.65 the 0 percent yield pressure pipe buckles as indicated by line 530, with the 20 percent and 40 percent yield pressure cases following in succession as the normalized bending moment increases to approximately 0.75 as indicated by lines 532, and 534, respectively Looking to FIGS. 19 through 21, the results of the analyses just described for the unreinforced, reinforced and double-weld reinforced are compared for the 0 percent, 20 percent, and 40 percent yield pressure cases.

As seen in FIG. 19, for the 0 percent yield pressure case both the single-weld reinforced joint 542 and the double-weld reinforced joint 544 substantially outperform the unreinforced joint 540, with the double-weld reinforced joint outperforming the single-weld reinforced joint.

FIGS. 20 and 21 depict similar results for the 20 percent and 40 percent yield pressure cases, respectively. As seen in FIG. 20, the single-weld 552 and double-weld 554 reinforced joints substantially outperform the unreinforced lap joint 550, and as seen in FIG. 21, the single-weld 562 and double-weld 564 reinforced joints similarly outperform the unreinforced lap joint 560.

Figure 22:
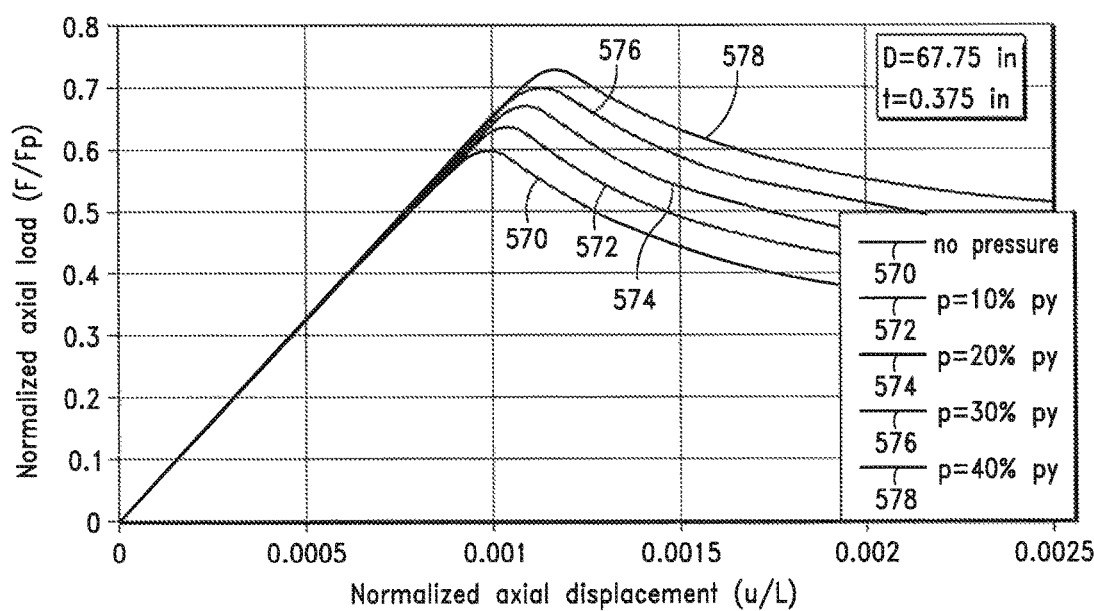
FIGS. 22-24 are graphical representations and comparisons of the results of axisymmetric analysis of compressive force applied to an unreinforced welded-lap joint, and a reinforced welded-lap joint in accordance with an exemplary embodiment of the present invention over various operational pressures.
Figure 23:
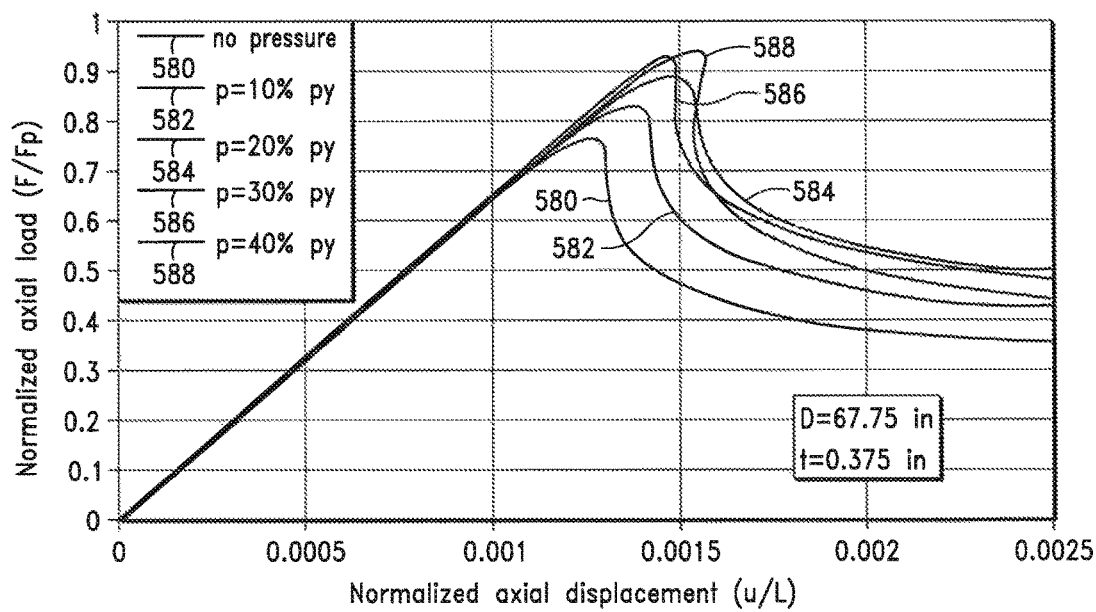
Figure 24:
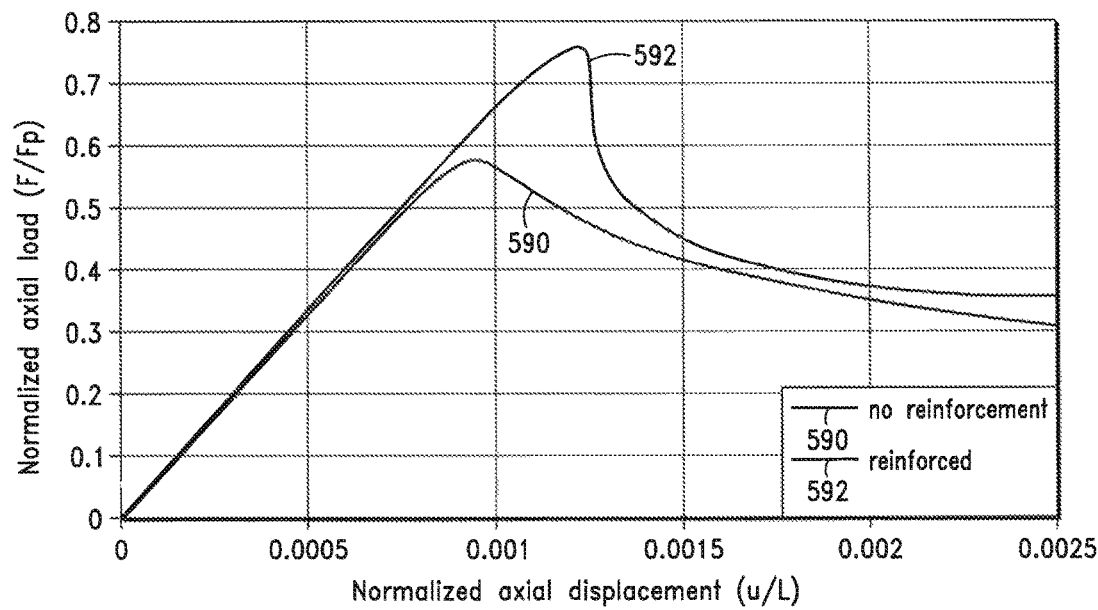

Turning to FIGS. 22 through 24, similar results of an axisymmetric model analysis is depicted.

As seen in FIG. 22, for an unreinforced welded-lap pipe joint, an applied axial load over varying yield pressures results in linear axial displacement up until the point that the joint buckles. For that unreinforced joint, at 0 percent yield pressure the buckling occurs at a normalized axial load of approximately 0.55 F/Fp as indicated by line 570, with the 10 percent, 20 percent, 30 percent, and 40 percent yield pressure cases following in succession as indicated by lines 572, 574, 576, and 578, respectively.

FIG. 23 presents the results of the analysis applied to a reinforced welded-lap pipe joint in accordance with the present invention over that same range of yield pressures. As indicated by lines 580, 582, 584, 586, and 588 the reinforced joint substantially outperforms the unreinforced joint, with the 0 percent yield pressure case 580 not buckling until a normalized axial load of approximately 0.75 is reached.

FIG. 24 compares the analysis data just discussed on a single graph for the 0 percent yield case which demonstrates that the reinforced welded-lap joint 592 of the present invention substantially outperforms an unreinforced welded-lap joint 590.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

The term "substantially" or "approximately", or any other qualifying term as used herein may be applied to modify any quantitative representation which could permissibly vary without resulting in a change in the basic function to which it is related. For example, in one embodiment the thicknesses of the wall of the pipe end and the wall of the reinforcing sleeve are described as being substantially identical, but may permissibly vary from that configuration if the variance does not materially alter the capability of the invention.

With respect to the steps of any method described herein or in the accompanying claims, no specific ordering of those steps is implied by the order in which those steps are described or claimed, and unless explicitly required the steps may be performed in any order in accordance with the present invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

Having thus described the invention what is claimed as new and desired to be secured by Letters Patent is as follows:

1. A method for reinforcing a welded-lap pipe joint, comprising:
   placing a cylindrical sleeve around a cylindrical first pipe segment adjacent an end of the segment such that the sleeve entirely overlaps the first pipe segment;
   expanding the end of the first straight pipe segment and the surrounding sleeve to form a bell-end receptacle at the end of the first straight pipe segment and to shape the cylindrical sleeve into a bell-shaped reinforcing sleeve;
   inserting a spigot-end of a second pipe segment into the bell-end receptacle;
   welding the spigot-end of the second pipe segment to the bell-end of the first pipe segment; and
   positioning the bell-shaped reinforcing sleeve along the bell-end of the first pipe segment such that the sleeve overlaps a portion of each of the first and second pipe segments.

2. The method of claim 1, further comprising welding the bell-shaped reinforcing sleeve to at least one of the first and second pipe segments.

3. The method of claim 2, wherein the welding the bell-shaped reinforcing sleeve step comprises welding the larger diameter second end of the sleeve to the first pipe segment.

4. The method of claim 2, wherein the welding the bell-shaped reinforcing sleeve step comprises welding the smaller diameter first end of the sleeve to the first pipe segment.

5. The method of claim 2, wherein the welding the bell-shaped reinforcing sleeve step comprises welding the smaller diameter first end and the larger diameter second end of the sleeve to the first pipe segment.

6. The method of claim 2, wherein the welding the bell-shaped reinforcing sleeve step comprises welding the larger diameter second end of the bell-shaped reinforcing sleeve to the first and second pipe segments.

7. The method of claim 2, wherein the welding the bell-shaped reinforcing sleeve step comprises welding the smaller diameter first end of the bell-shaped reinforcing sleeve to the first pipe segment and welding the larger diameter second end of the bell-shaped reinforcing sleeve to the first and second pipe segments.

8. The method of claim 2, wherein the first pipe segment is welded to the second pipe segment along an exterior surface of the first pipe segment.

9. The method of claim 2, wherein the first pipe segment is welded to the second pipe segment along an interior surface of the first pipe segment.

10. The method of claim 1, wherein the bell-shaped reinforcing sleeve comprises a wall having a thickness substantially the same as a wall of the first pipe segment.

11. The method of claim 1, wherein the bell-shaped reinforcing sleeve is positioned such that it overlaps the spigot-end to bell-end weld.

12. The method of claim 1, wherein the bell-shaped reinforcing sleeve has a length of approximately 0.03 times a diameter of the bell-end of the first pipe segment.

13. The method of claim 1, wherein the bell-shaped reinforcing sleeve has a length of approximately at least 2 inches.

\* \* \* \* \*